(12) United States Patent
Pillai et al.

(10) Patent No.: US 9,382,596 B2
(45) Date of Patent: Jul. 5, 2016

(54) LASER CLADDING FE—CR ALLOY ON DOWNHOLE TOOLS

(75) Inventors: Raju Pillai, Pasadena, TX (US); Jiinjen A. Sue, The Woodlands, TX (US); Parul W. Dhall, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 157 days.

(21) Appl. No.: 13/235,070

(22) Filed: Sep. 16, 2011

(65) Prior Publication Data

US 2013/0068449 A1  Mar. 21, 2013

(51) Int. Cl.

| | |
|---|---|
| C21D 6/00 | (2006.01) |
| C21D 9/00 | (2006.01) |
| C22C 38/18 | (2006.01) |
| C22C 38/22 | (2006.01) |
| E21B 10/46 | (2006.01) |
| B23K 35/30 | (2006.01) |
| C21D 1/09 | (2006.01) |
| C21D 1/38 | (2006.01) |
| B23K 26/34 | (2014.01) |
| C22C 38/02 | (2006.01) |
| C22C 38/24 | (2006.01) |
| C22C 33/02 | (2006.01) |
| B23K 35/02 | (2006.01) |
| B23K 26/32 | (2014.01) |

(52) U.S. Cl.
CPC . *C21D 6/00* (2013.01); *B23K 26/32* (2013.01); *B23K 26/34* (2013.01); *B23K 35/0244* (2013.01); *B23K 35/308* (2013.01); *C21D 1/09* (2013.01); *C21D 1/38* (2013.01); *C21D 6/002* (2013.01); *C21D 9/00* (2013.01); *C22C 33/0257* (2013.01); *C22C 38/02* (2013.01); *C22C 38/18* (2013.01); *C22C 38/22* (2013.01); *C22C 38/24* (2013.01); *E21B 10/46* (2013.01); *B23K 2203/50* (2015.10); *C21D 2201/05* (2013.01); *C21D 2211/001* (2013.01); *C21D 2211/008* (2013.01)

(58) Field of Classification Search
CPC .......... E21B 43/00; E21B 17/10; C21D 6/00; C21D 1/09; C22C 38/22; B23K 26/3206; B23K 26/34
USPC ...... 148/522, 325, 333; 420/34, 104
See application file for complete search history.

(56) References Cited

U.S. PATENT DOCUMENTS

| | | | | |
|---|---|---|---|---|
| 6,375,895 | B1 * | 4/2002 | Daemen | 420/105 |
| 8,419,868 | B2 * | 4/2013 | Lai | 148/529 |
| 8,474,541 | B2 * | 7/2013 | Branagan et al. | 166/380 |
| 2006/0165551 | A1 * | 7/2006 | Kapoor et al. | 420/69 |
| 2008/0160496 | A1 * | 7/2008 | Rzepakovsky et al. | 435/1.3 |

OTHER PUBLICATIONS

NPL: Szkodo, Cavitation erosion behavior of laser processed Fe—Cr—Mn and Fe—Cr—Co alloys, J. Achievements in Materials and Manufacturing Engineering, vol. 18, Sep. 1-2, 2006, pp. 239-242.*

* cited by examiner

*Primary Examiner* — Jie Yang
(74) *Attorney, Agent, or Firm* — Conley Rose, P.C.

(57) ABSTRACT

A hardfacing composition composed of an Fe—Cr alloy. The alloy is comprised of 80 wt % iron, about 2 wt % to about 20 wt % Cr, less than 1 wt % Si and less than 1 wt % C. The alloy's microstructure is at least 80 vol % martensite; and less than 20 vol % austenite.

21 Claims, 14 Drawing Sheets

LASER CLADDING FE—CR ALLOY ON DOWNHOLE TOOLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The present invention relates generally to hardfacing materials (also referred to herein as hardcoatings) that provide improved durability to tools and components to which they are applied, as well as to a system and methods for applying the protective hardcoatings to a machine or tool element that is otherwise subjected to abrasion, corrosion, erosion and/or high wear during service. The invention also relates generally to such a machine or tool element having the protective hardcoating. The hardcoatings, system and methods disclosed herein are particularly suited for use with tools and components used in drill stings, such as drill bits, reamers, tool joints, stabilizers, drill collars, mandrels, wash pipes, mud motors, and the like, but are likewise suited for use on other tools and machine elements not associated with drilling which require protection against excessive wear. The invention also relates to hardfacing compositions comprised of laser cladding Fe—Cr alloys which contain low quantities of austenite.

2. Background of the Invention

Oil and gas wells are typically formed by rotary drilling processes that involve a drill bit connected onto the end of a drill string. Rotational motion of the drill bit in contact with the earth can create a wellbore by the earth boring action of the drill bit. The rotational motion of the drill bit can be provided by a rotary drive mechanism located at the surface that turns the drill string that in turn gives motion to the drill bit. Alternately a downhole "mud motor" can be used to convert hydraulic pressure of a circulating fluid into rotational motion of the drill bit, enabling drilling of the well without the need to turn the entire drill string.

During drilling operations, a fluid, referred to as drilling fluid or drilling mud is circulated through the drill string and up through the wellbore to the surface. The drilling fluid is used to remove the cuttings resulting from the drilling process, to reduce the occurrence of plugging of the drill bit, and can be used to cool the areas of contact between the bit and the formation that can generate heat.

In operation, downhole tools often encounter extreme conditions, including high heat, high pressure, and vibration. Additionally, these tools are subjected to rotational and sliding contact with abrasive formations, are exposed to corrosive fluids that also cause corrosion and erosion, and experience impact loading as components contact the borehole bottom and sidewalls. To protect against these conditions, particularly excessive wear, corrosion, and erosion, various surfaces of downhole tools are provided with a protective coating of hardfacing. These hardface coatings provide increased hardness to the exterior of the tool elements, particularly to the surfaces which come in contact with the abrasive formations. The required hardness is often accomplished by providing a coating composed of tungsten carbide particles which are cemented in place by a metal binder. The matrix formed by the carbide particles and the binder is applied as a coating to various exposed and vulnerable surfaces. Alternatively, a uniform coating of a hard material may be applied to an entire tool or component surface.

Conventional hardfacing materials used to provide wear resistance to the underlying substrate of the drilling tool can comprise carbides. The carbide materials are used to impart properties of wear resistance and fracture resistance to the tool. High-velocity-oxy-fuel (HVOF) tungsten carbide hardfacings containing some fraction of a metallic phase and hard chromium plating have been employed to protect these tools from wear, corrosion, and erosion. However, these hardcoatings are less than adequate in a corrosive environment because of a failure of the mechanical bond between the hardfacing (or plating) and the base metal of the tools. Often, microcracks develop from bending and thermal loading, which expose the base metal to corrosive fluid and can cause premature chipping, flaking, and fracturing of the coating. This has led to hardfacing delamination and catastrophic failure of some typical coatings.

Hardfacing is typically applied onto the underlying tool surface by conventionally known welding methods or thermal spray techniques, such as Laser Cladding, Plasma Transferred Arc or Flame Spray techniques. The process of welding the hardmetal materials onto the underlying substrate can make it difficult to provide a hardfaced layer having a consistent coating thickness, which can determine the service life of the bit.

Plasma transferred arc welding (PTAW) process has also been used to deposit a metallurgically bonded corrosion-resistant hardfacing of Hastelloy and Colmonoy on such tools. However, these hardfacing are prone to failure in either a high acidic environment containing $CO_2$ and $H_2S$ or abrasive environment, or both. The process causes higher dilution to the base material adjacent to the hardfacing, compared to laser cladding.

Down-hole drilling tools have long suffered from abrasion wear, erosion, and corrosion, which are the limiting factors for tool life. Accordingly, there remains a need in the art for a hardfacing overlay that has improved corrosion resistance, adequate hardness for abrasion resistance, metallurgical bonding to the base metal of the drilling apparatus, dimensional stability, and little effect on mechanical properties of the base material.

BRIEF SUMMARY OF THE DISCLOSED EMBODIMENTS

These and other needs in the art are addressed in one embodiment, by a hardfacing composition comprising an Fe—Cr alloy. The alloy includes at least 80 wt % iron, about 2 wt % to about 20 wt % Cr, less than 1 wt % Si and less than 1 wt % C. The alloy includes a microstructure of least 80 vol % martensite; and less than 20 vol % austenite. In some embodiments, the composition is disposed on a base material of a tool chosen from the group consisting of drill bit, rotary cone bit, drag bit, mill tooth bit, reamer, under-reamer, stabilizer, a mud rotor, a mandrel and a wash pipe and centralizer.

In other embodiments, a method of making a hardfacing composition comprises injecting a Fe—Cr powder into a laser beam and heating the powder to a temperature sufficient to form a molten alloy that comprises at least 99 vol % austenite. The molten alloy is applied to a base material, and the austenite quenched at a rate greater than 1300K/sec, forming the hardfacing composition. In some embodiments the composition has a microstructure comprising greater than 80 vol % martensite and less than 20 vol % austenite.

In some further embodiments, a method of making a structure coated with a hardfacing composition comprises coating a base material with a molten Fe—Cr alloy. The coating comprises injecting a Fe—Cr powder into a laser beam and heating the powder to a temperature sufficient to form a molten alloy that comprises at least 99 vol % austenite. The molten alloy is applied to a base material, and the austenite quenched at a rate greater than 1300K/sec, forming the hardfacing composition. In some embodiments, the composition has a microstructure comprising greater than 80 vol % martensite and less than 20 vol % austenite. In some embodiments, the composition is applied to an underlying metal via a laser cladding technique.

In other embodiments, an apparatus employed in drilling a borehole comprises a drill sting component adapted to be connected into a drill sting, and at least one hardfacing composition is affixed to the component. The hardfacing composition includes an Fe—Cr alloy comprising at least 80 wt % iron, about 2% to about 20 wt % Cr, less than 1 wt % Si; and less than 1 wt % C. The alloy comprises a microstructure of least 80 vol %, and less than 20 vol % austenite. In some further embodiments the drill string component is chosen from the group consisting of drill bit, mill tooth bit, reamer, under-reamer, stabilizer, centralizer, mandrel, wash pipe and mud motor.

Thus, embodiments described herein comprise a combination of features and advantages intended to address various shortcomings associated with certain conventional hardfacing compositions and methods of using the same. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

Figure 1:
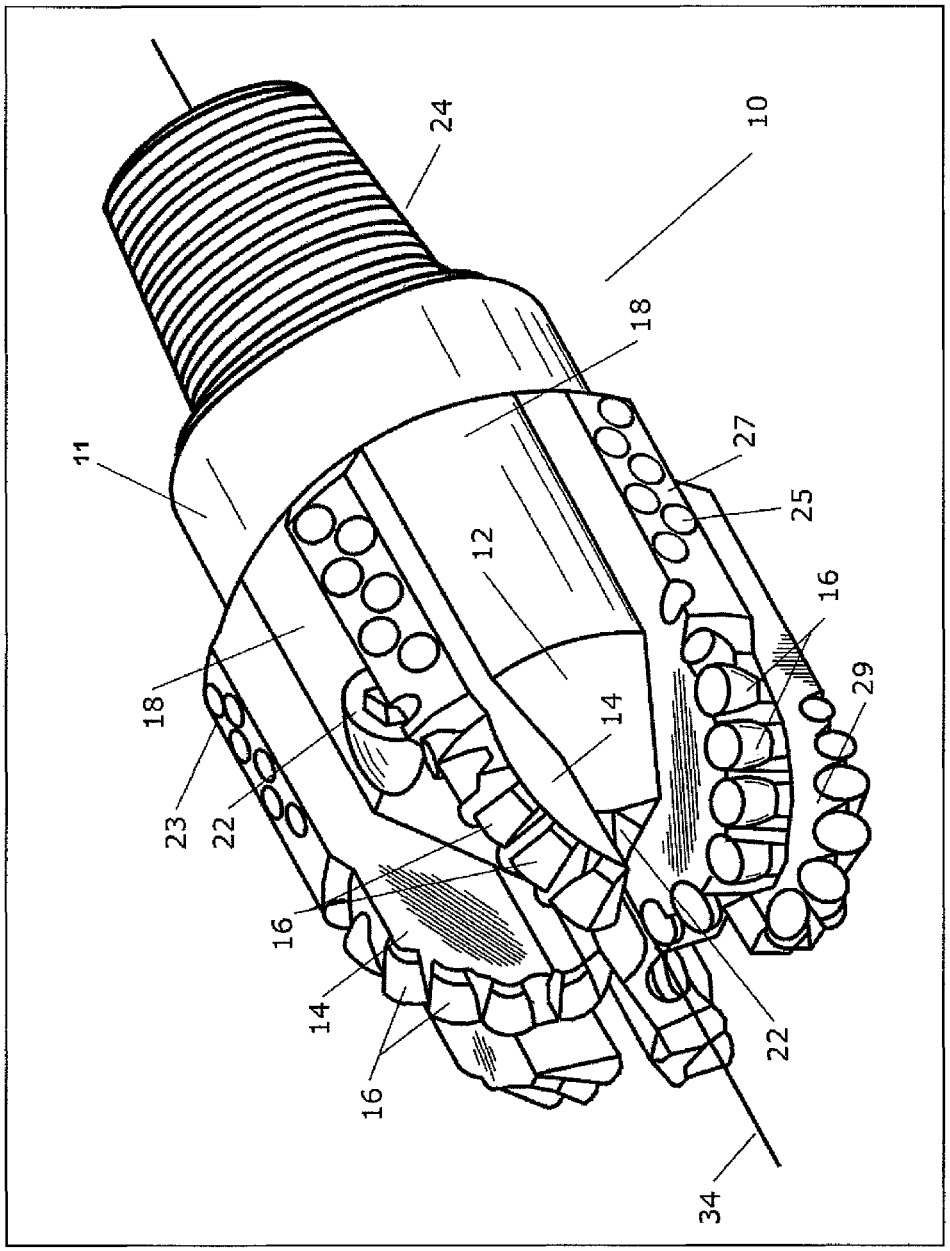
FIG. 1 depicts an example of a rotary drag bit 10, made in accordance with the principles described herein.

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection via other intermediate devices and connections. As used herein, the term "about," when used in conjunction with a percentage or other numerical amount, means plus or minus 10% of that percentage or other numerical amount. For example, the term "about 80%," would encompass 80% plus or minus 8%.

FIG. 1 shows an example of a rotary drag bit 10 having a bit body 11 made of a material such as machined steel or a matrix material. The bit body 11 has a leading face 12 provided with a plurality of protruding, radially spaced blades 14. Each blade 14 carries a plurality of cutting elements 16. Between each pair of adjacent blades 14 is a channel 18 through which drilling fluid flows while bit 10 is in use. Bit 10 further includes a series of passages provided internally of the drill bit body 11, each passage terminating at a nozzle 22. The flow of drilling fluid serves to clean and cool the cutting elements 16 while in use and provide a means of circulating cuttings out of the wellbore.

The blades 14 continue from the leading face 12 onto the bit body 11 to form a gage contact surface 23 that defines the outer diameter of the bit 10. The gage contact surface 23 includes wear resistant inserts 25 pressed into the gage contact surface 23, and further includes a hardfacing composition 27 surrounding the wear resistant inserts 25. Contact between the gage contact surface 23 and the wellbore is abrasive and can lead to elevated temperatures of the hardfacing composition 27.

The cutting elements 16 are also located within a region of hardfacing composition 29 applied to blades 14. In the embodiment shown, hardfacing composition 29 is applied to fill the area between the cutting elements 16, an area referred to as webbing. Contact between the hardfacing composition 29 adjacent to the cutting elements 16 and the shearing action forming the wellbore is abrasive and can lead to elevated temperatures of the hardfacing composition 29.

Figure 2:
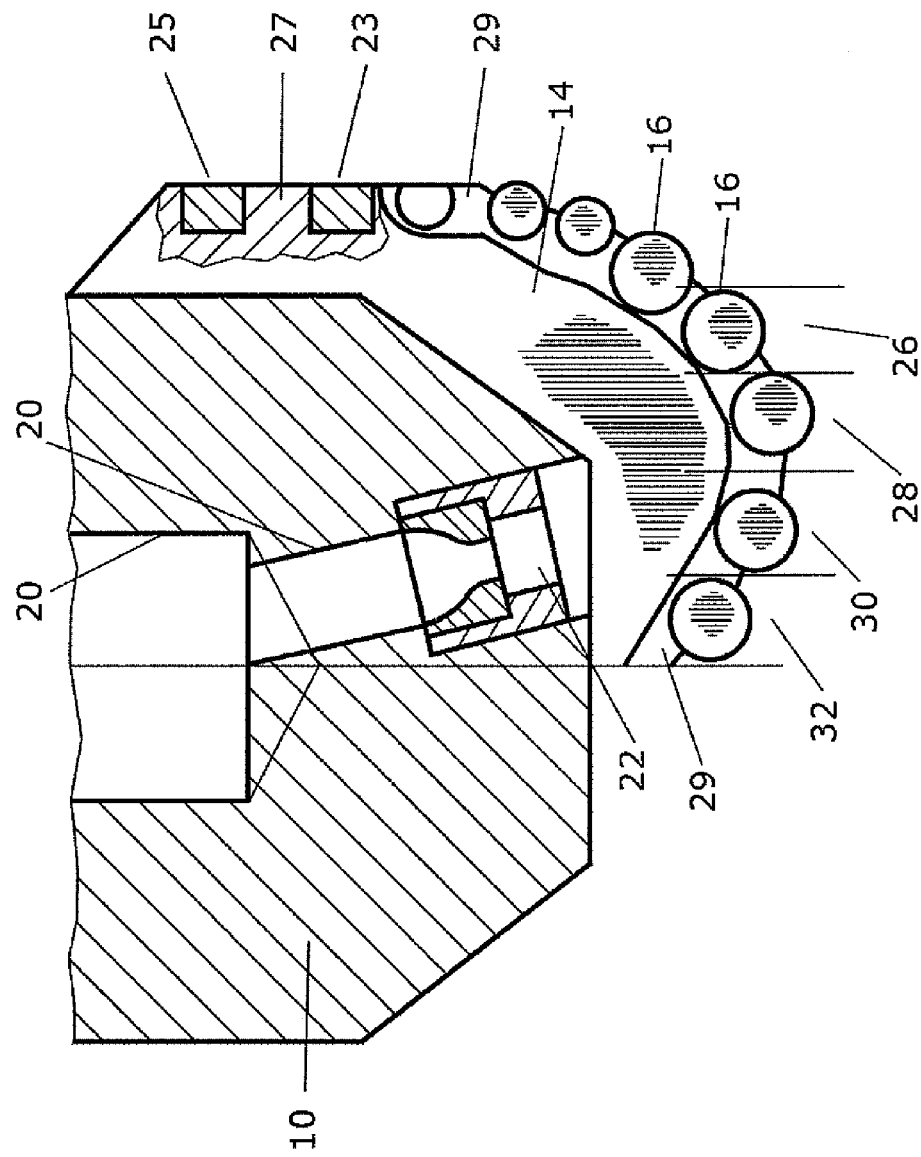
FIG. 2 depicts a cross-sectional view of the drill bit 10, made in accordance with principles described herein.

FIG. 2 provides a cross-sectional view of the drill bit 10 that shows the face of a blade 14, the placement of the cutting elements 16 and of the wear resistant inserts 25. Also shown are the hardfacing composition areas 27 on the gage contact surface 23 and the hardfacing composition 29 on the webbing between the cutting elements 16 that can experience abrasion and thermal stress.

Figure 3A:
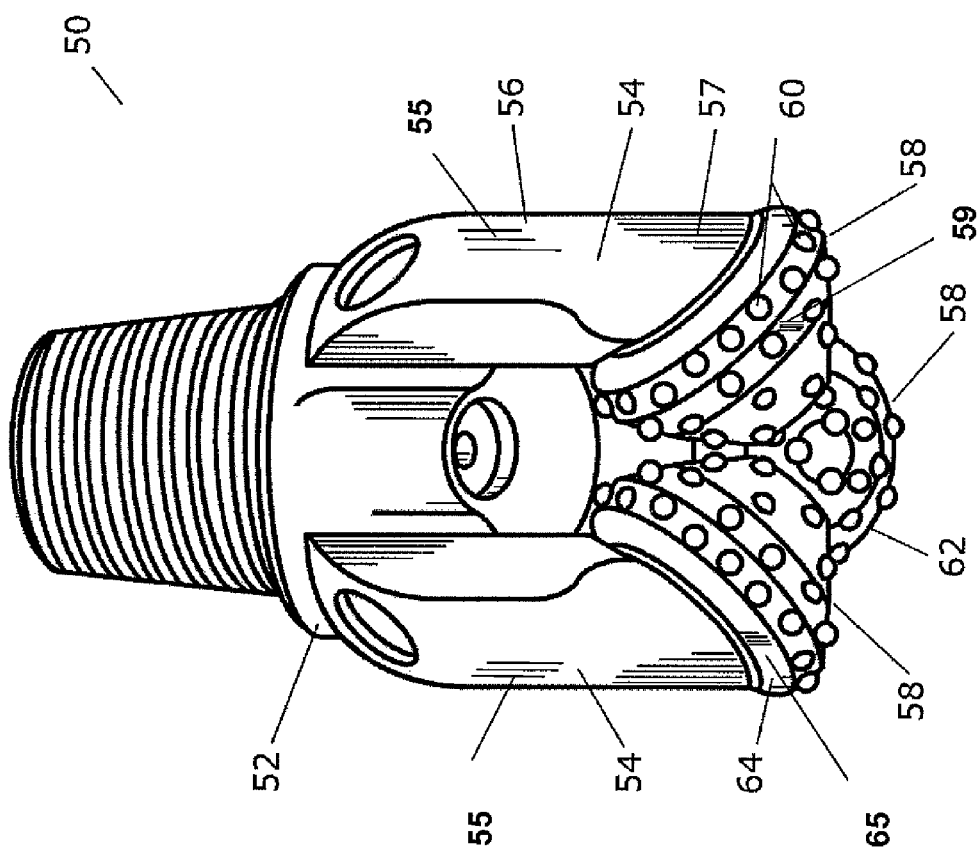
FIG. 3 depicts a rolling cutter drill bit 50, made in accordance with principles described herein.
FIG. 3b depicts a mandrel 69, made in accordance with principles described herein.

Referring to FIG. 3a, a rolling cutter drill bit 50 includes a body 52. The body 52 comprises three similar leg portions 54 (only two are visible) that include an external surface 56 on each leg portion 54. In this environment, the external surface includes a shirttail region 57 near the bottom of the leg portion 54. The external surface 56 and/or shirttail region 57 are covered with a hardfacing composite material 55. Contact between the hardfacing composition 55 and the wellbore is abrasive and can lead to elevated temperatures of the hardfacing composition. A rolling cutter 58 is rotatably mounted upon each leg portion 54. Attached to the rolling cutter 58 are cutting inserts 60 which engage the earth to effect a drilling action and cause rotation of the rolling cutter 58. The exposed surface 62 of the rolling cutters 58 surrounding the cutting inserts 60 is covered with a hardfacing composition 59. Contact between the hardfacing composition 59 and the wellbore is abrasive and can lead to elevated temperatures of the hardfacing composition 59.

The portion of the rolling cutter 58 near the leg portion 54 can be referred to as the rolling cutter gage contact surface 64 and also includes a hardfacing composition 65. The rolling cutter gage contact surface 64 is a generally conical surface at the heel of a rolling cutter 58 that engages the sidewall of a wellbore as the bit is rotated. Contact between the rolling cutter gage contact surface 64 and the wellbore is abrasive and can lead to elevated temperatures of the hardfacing composition 65 located on the rolling cutter gage contact surface 64.

Figure 3B:
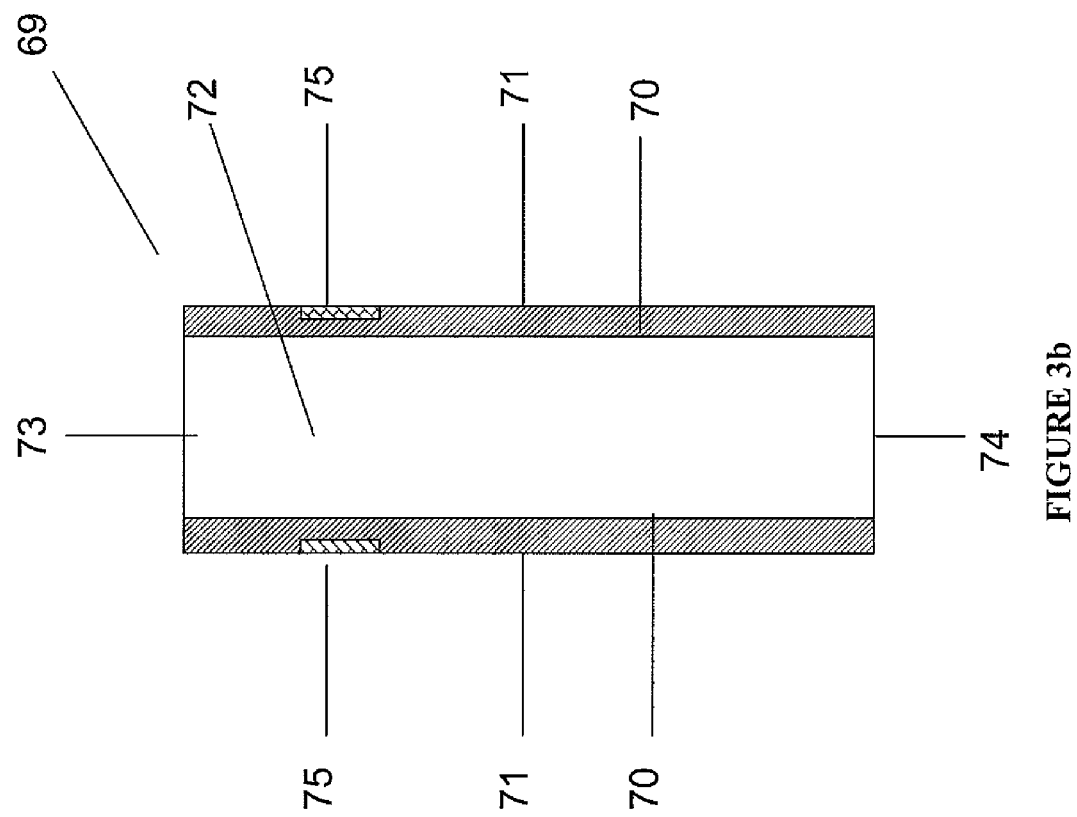

Referring to FIG. 3b, a mandrel 69 includes a tubular body, that comprises an inner wall 70, and an outer wall 71, forming an inner bore 72, through which in certain examples, drilling fluid may flow. The mandrel may be rotated by a drive shaft, which rotates in response to the flow of drilling fluid under pressure through the power section. Generally, the mandrel rotates relative to a cylindrical housing, which is connected to a drill string. The ends of the mandrel may be coupled to the drill string, with an upper end 73 coupled to the lower end of a drive shaft, and a lower end 74 adapted for connection to a drill bit. The mandrel's outer wall 70 may be covered with a hardfacing composite material 75. The hardfacing 75, may cover the entire outer surface 71, or be selectively placed on the outer surface 71 at points on the mandrel which are prone to wear. Contact between the hardfacing composition 75 and the wellbore is abrasive, and in some cases corrosive, and can lead to elevated temperatures of the hardfacing composition.

Embodiments of the present invention include hardfacing compositions applied on the surfaces of down hole drilling tools, such as mandrel 69 formed by the application of a laser cladding Fe—Cr alloy onto such surfaces. The alloy is engineered to comprise a microstructure that imparts corrosion resistance, adequate hardness for abrasion resistance, the ability to metallurgically bond to the underlying surface metals of drilling tools and that has dimension stability. The embodiment disclosed, can include one or more layers of hardfacing, disposed at various locations on the drilling tools surface, including a stroking mandrel, a bearing mandrel and wash pipe, to provide such improved properties where required.

Generally speaking, when compared to conventional hardmetal materials, the hardfacing materials described herein and used to provide corrosion and abrasion wear resistant surfaces to drilling equipment are engineered with the goal of providing improved corrosion and abrasion wear resistance, ability to metallurgically bond to the underlying surface metals of drilling tools, and to provide dimension stability and no effect on mechanical properties of the base material.

The basic structure of a drill bit, whether of a rotary cone or fixed cutter design and the basic structure of drilling equipment, is well known. Embodiments of the present invention relate to drill bits having corrosion and abrasion wear resistant hardfacing material surfaces, and methods for forming the same. Embodiments of the present invention also include the use of corrosion and abrasion wear resistant composite material surfaces on drilling equipment and tools other than drill bits, for example reamers that can be used to expand a wellbore diameter, mud motors, tool joints, stabilizers, drill collars, mandrels and others. Embodiments also address the potential delamination of hardfacings by providing a hardfacing composition with an improved ability to metallurgically bond to the underlying surface metals of drilling tools.

Generally speaking, for the effective use of a drill bit, it is important to provide as much wear resistance as possible on the portions of the bit that can have contact with the abrasive formations, and in high erosion or other high wear conditions. The effective life of the bit is enhanced as abrasion wear, erosion, and corrosion resistance is increased. As wear occurs, the drill bit must be replaced when the rate of penetration decreases to an unacceptable level. It is therefore, desirable to minimize wear so that the footage drilled by each bit or the bit's rate of penetration, is maximized. Enhancing wear resistance and thus bit life not only decreases direct cost, but also decreases the frequency of having to "round trip" a drill string to replace a worn bit with a new one.

Similarly, as the bit's gage contact surfaces wear, the diameter of the hole drilled by the bit may decrease, sometimes causing "stuck" tools or other drilling problems, or requiring "reaming" of the hole by the next bit used. Advances in maintaining wear resistance of the drill bit wear surfaces is desirable to increase the duration which a hole's diameter (or gage) can be maintained, to enhance the footage a drill bit can drill before needing to be replaced, and to enhance the rate of penetration of such drill bits. Such improvements generally translate into reduction of drilling time and expense.

The corrosion and abrasion wear resistant hardfacing materials useful for forming drilling tool surfaces described herein can be applied onto a desired underlying substrate or base material, such as a metal or metal alloy, according to any suitable method. Accordingly such hardfacing compositions are described in one embodiment, where the hardfacing composition is comprised of an Fe—Cr alloy.

In one particular embodiment, the alloy is comprised at least 80 wt % iron, about 2 wt % to about 20 wt % Cr, less than 1 wt % Si and less than 1 wt % C. The alloy has a microstructure of least 80 vol % martensite; and less than 20 vol % austenite. In other embodiments of the composition, the martensite of the microstructure takes forms a columnar structure, the columns are perpendicular ±15 degrees, to the alloy's functional surface. The columns are about 30 μm in width. In some embodiments of the composition, the martensite microstructure has a ratio of x-ray diffraction intensity in <110> to x-ray diffraction intensity (I) in <200>, I(110)/I (200), greater than about 12, wherein the martensite microstructure has a predominant <110> crystallographic orientation. In some embodiments, the crystallographic orientation of martensite crystallites is a non random orientation. In further embodiments, the crystallite size in the <110> direction is greater than about 200 Angstrom. The following examples of conditions and parameters are given for the purpose of illustrating certain exemplary embodiments of the present invention.

EXAMPLES

Example 1

Composition, Formation and Microstructure of Hardfacing Compositions

As described herein, three hardfacing compositions may be produced by a laser cladding technique. The base metal and the hardfacing Fe—Cr alloy powders were selected so as to produce a hardfacing composition having a thermal expansion coefficient close to that of its base materials. This selection practice increases the propensity of metallurgical bonding between the hardfacing and the base material, and reduces the potential for delamination to occur when the hardfacing/base material construct experiences heating in service. The chemistry of the alloy powders therefore correspond to that of the steel metals: AISI 420, AISI 431 and M2, listed in Table 1.

TABLE 1

Powder Compositions for Laser Cladding Fe—Cr Alloy Hardfacings

| Powder | Fe | C | Cr | W | Mo | V | Mn | Ni | P | S | Si |
|---|---|---|---|---|---|---|---|---|---|---|---|
| A | 100%-sum of constitutional elements | >0.15 | 13 | | | | 1max | | 0.04max | 0.03max | 1.0 max |
| B | 100%-sum of constitutional elements | 0.2 | 16 | | | | 1max | 1.87 | 0.04max | 0.03max | 1.0 max |
| C | 100%-sum of constitutional elements | 0.85 | 4.15 | 6.15 | 5 | 1.85 | 0.3 | | | | 0.3 |

In each instance, the Fe—Cr powder (A, B, or C) was injected into a laser beam, in which the beam size was adjusted by focusing the laser lenses, to form a beam typically of 2-5 mm, the power of the laser ranged from 2 to 4 kW and a molten pool of Fe—Cr alloy was produced on the surface of the component to be coated (such as a drill bit, a mill tooth bit, a reamer, a under-reamer, a stabilizer, a centralizer, mandrel, wash pipe and a mud motor). The molten pool's temperature was about 2300K.

The coverage of hardfacing on the underlying component (see FIGS. 1, 2, and 3a and 3b for examples of placements of such hardfacings) was accomplished by a pre-determined traverse of the laser beam or a predetermined rotation speed of the component. As a molten pool advanced from one spot to the next, the molten hardfacing material was solidified substantially instantaneously with a quenching rate exceeding 1300K/s. Due to the fast quenching rate, fine microstructure were developed in the hardfacing (see FIGS. 4, 5, 6, 7, and 8).

In the molten state, the hardfacing contained 100 vol % austenite. The martensite phase appeared from an austenite transformation as the hardfacing alloy cooled below the martensite formation temperature (Ms). The amount of martensite and retained austenite depend on the chemical elements within the hardfacing alloy and the quenching rate. In the case of each powder A, B or C, a quantity of austenite remained in the hardfacing.

Austenite is the face-centered cubic phase of alloyed iron, formed at high temperature. Its unit cell volume is greater than the volume of either the martensitic or ferritic unit cell. The retained austenite can further transform into other phases when the tool having the hardfacing applied is in service, under stress or thermal load, and the retained austenite can possibly change its hardness and strength. Therefore the presence of large quantities of austenite is not desirable for down hole tools, due to its thermal and dimensional instability.

In embodiments herein described, Fe—Cr hardfacings A, B and C, contained reduced levels of retained austenite as compared to conventional hardfacing compositions. It is therefore believed that hardfacing compositions herein described, when applied to drilling tools, will have enhanced dimensional stability and mechanical and physical properties as compared to some conventional hardfacings.

The hardness of the hardfacing compositions A, B, and C as described herein, were measured by a Rockwell hardness test using a 120° cone diamond indenter with 150 kgf. The Rockwell C hardness numbers (Rc) and the equivalent microhardnesses (HV) are given in Table 2 along with other material parameters for the hardfacings. Although the hardnesses of hardfacings A, B, and C, are not as hard as HVOF tungsten carbide hardfacing and hard Chromium plating, (with hardness of 1200 HV and 900 HV, respectively); they are harder than hestalloy and colmonoy overlays, (which have a hardness of 185 HV and 434 HV, respectively). However, it is known that some HVOF tungsten carbide hardfacing and hard chromium plating's fail under corrosive conditions. Further, hestalloy and colmonoy are also prone to failure under highly acidic and abrasive environments.

TABLE 2

| | | Material Parameters of Laser Hardfacing | | | | |
|---|---|---|---|---|---|---|
| Laser Cladding Hardfacing | I(110)/I(200) | Column size (µm) | Crystallite Size in<110> (Å) | Retained Austenite (vol %) | Hardness (Rc) | Ms (° C.) |
| A | 14.7 | 15-25 | 136 | 5.9 | 60 (697 Hv) | 445 |
| B | 16 | 8-15 | 106 | 13.6 | 53 (560 Hv) | 122 |
| C | 14.6 | — | 143 | 25.1 | 65 (832 Hv) | −290 |

The Martensite formation temperature in Centigrade (Ms), was calculated using the following equation;

$$Ms\ (^\circ C.)=1302-42(\%\ Cr)-61(\%\ Ni)-33(\%\ Mn)-28(\%\ Si)-1667(\%\ [C+N]) \quad (1)$$

The laser hardfacing compositions A, B and C, were subjected to X-ray diffraction analysis using Cu Kα radiation (λ=1.5406Å) to determine preferred orientation, crystallite size, phases and the amount of retained austenite. All hardfacings contained a martensite phase exhibiting a predominant orientation in the <110> direction, which was expressed in terms of ratio of x-ray diffraction intensity in <110> to <200>. For comparison purposes, typically a random orientation of martensite has I(110)/I(200)=8. All three laser hardfacings A, B, and C had nearly the same degree of <110> preferred orientation of martensite, where the has I(110)/I(200) was greater than 12.

Figure 9A:
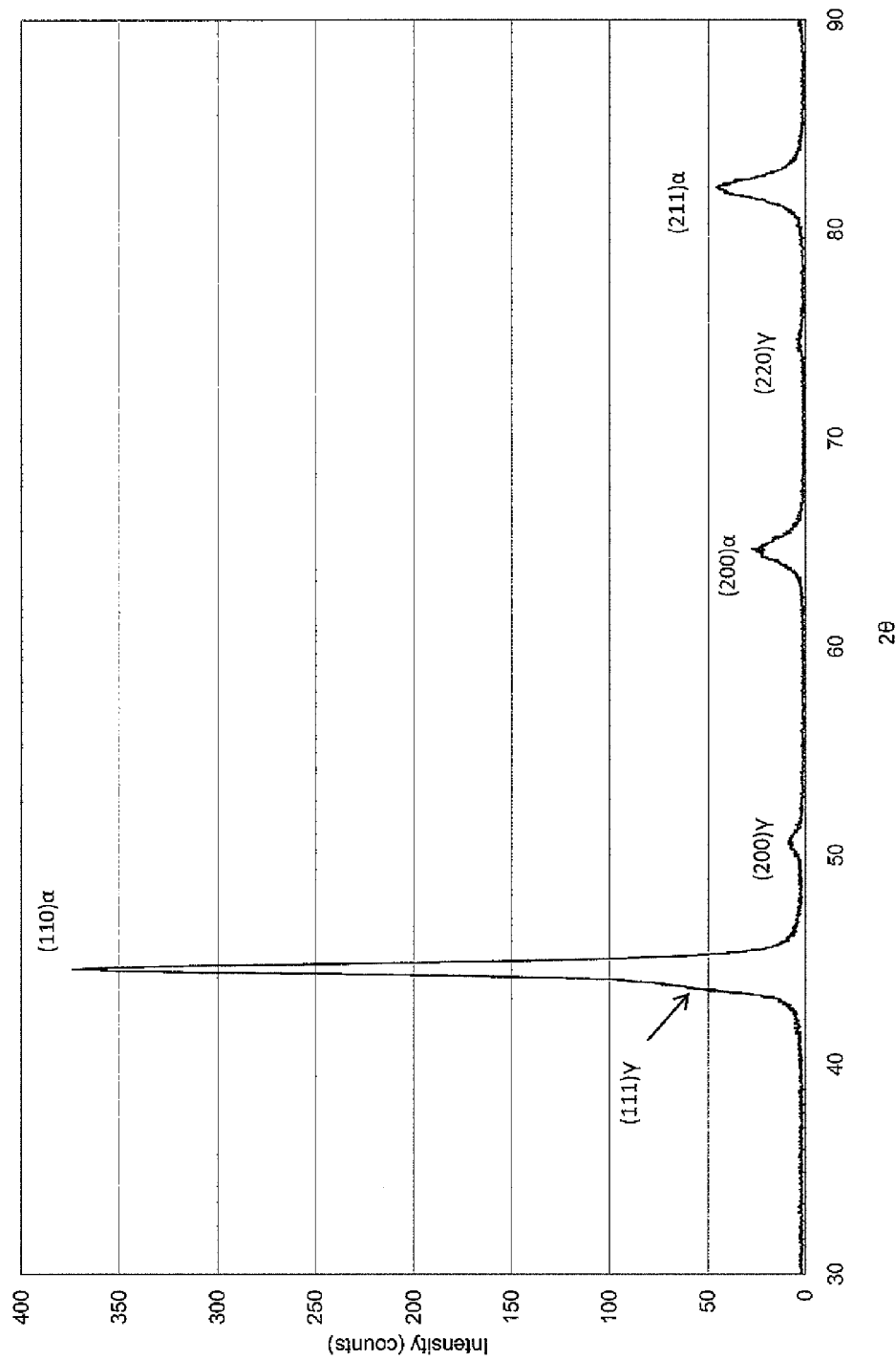
FIGS. 9a, 9b, 9c are XRD spectra of hardfacing composition A B and C made in accordance with principles described herein.
Figure 9B:
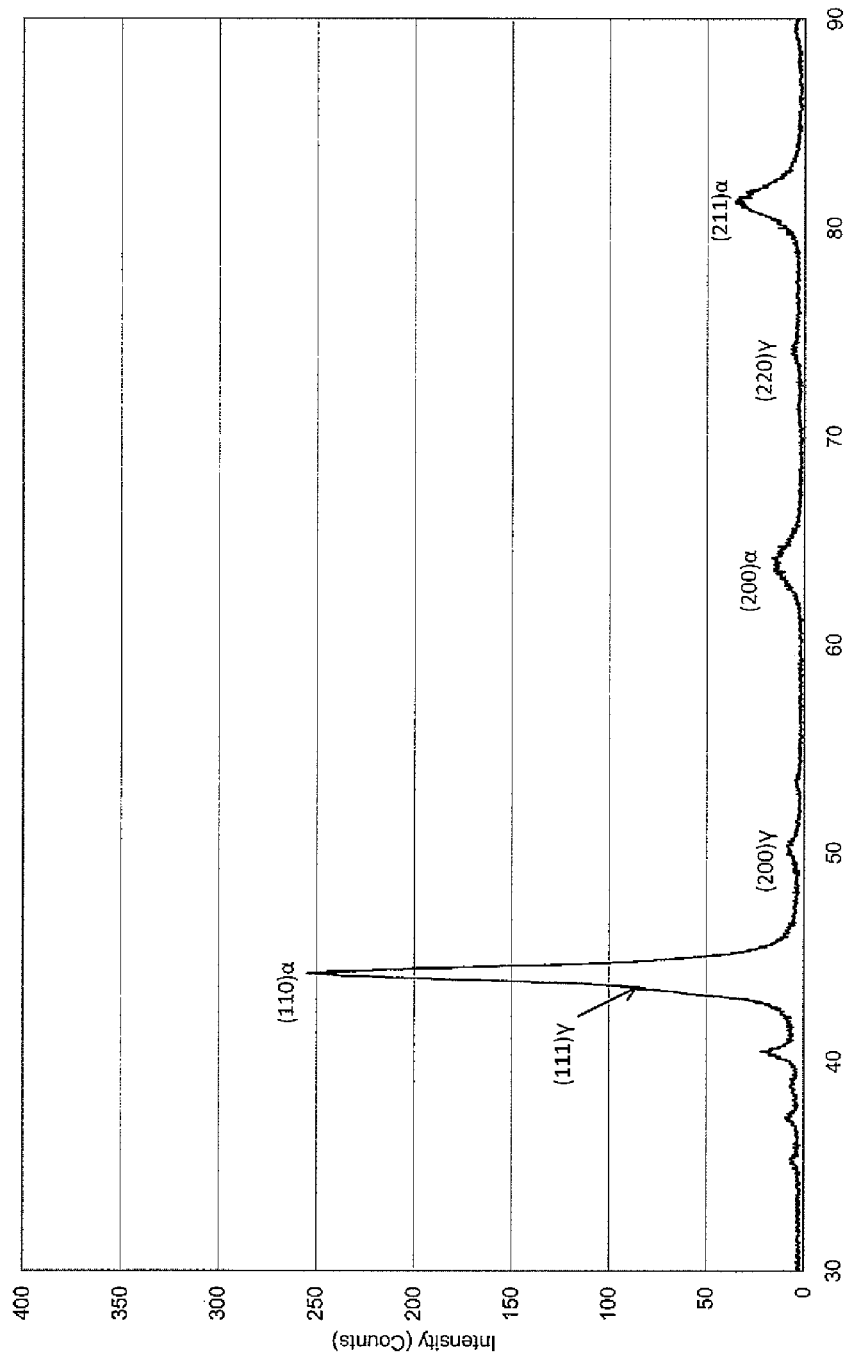
Figure 9C:
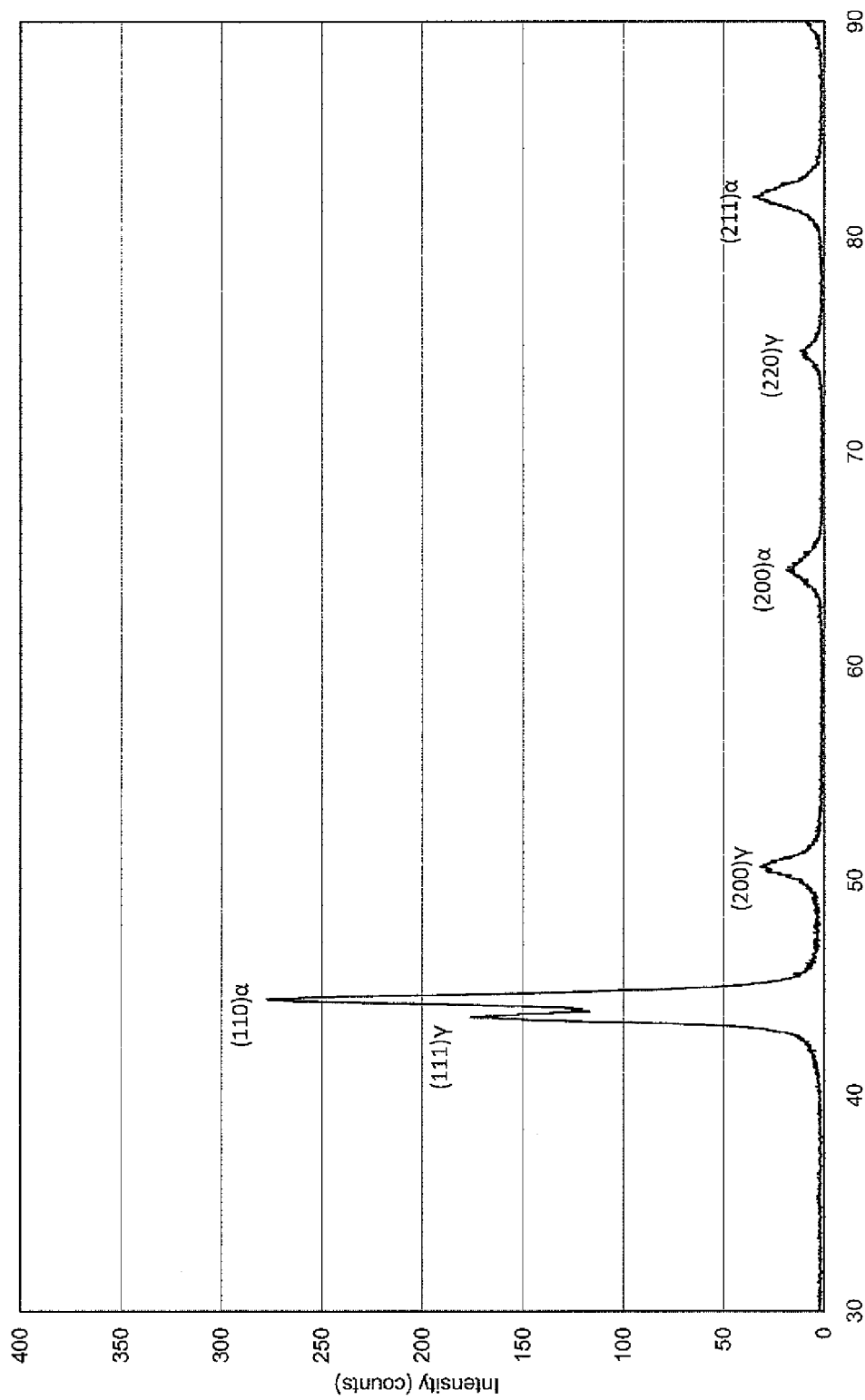
Figure 9D:
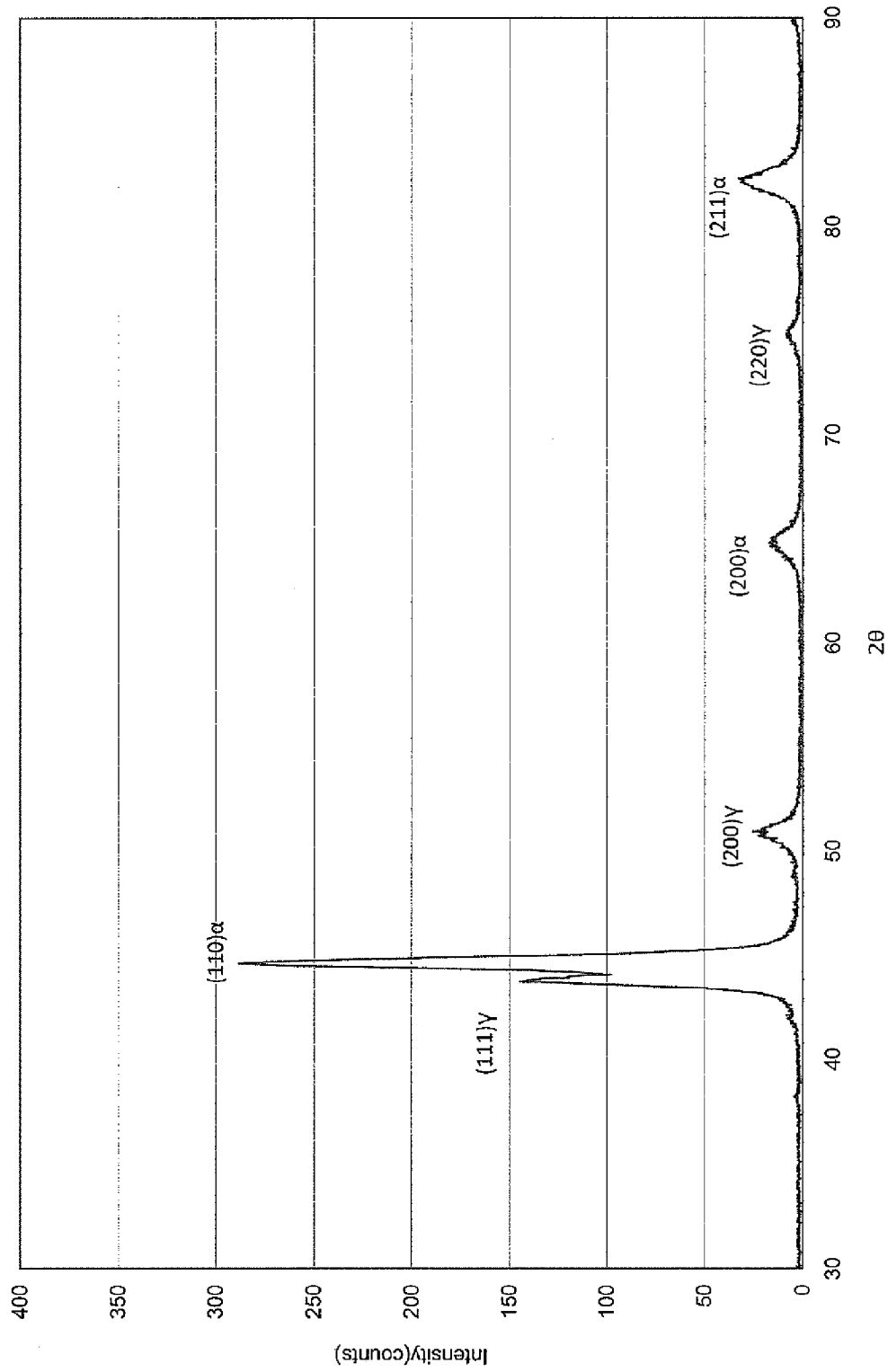
FIG. 9d is an XRD of conventionally quenched steel.

The amount of a phase in the hardfacing is proportional to the integrated intensity of its diffraction peak, as illustrated by the X-ray diffraction spectra for hardfacing A, hardfacing B and hardfacing C, depicted in FIG. 9a, FIG. 9b, and FIG. 9c respectively. In these figures, γ represents austenite phase and α represents martensite phase. For comparison, FIG. 9d depicts the X-ray diffraction spectra of AISI 420 steel quenched at conventional rates and indicative of higher levels of austenite as compared to hardfacings A, B and C. Since the preferred orientation significantly affects the calculation of the amount of austenite from a diffraction peak, the volume fraction of austenite was determined by the proportionality of the integrated areas of (220) and (311) austenite XRD peaks (X-Ray diffraction peaks) to the integrated areas of (200) and (211) of martensite peaks.

The crystallite size of martensite was estimated using Scherrer equation:

$$d=0.9\lambda/B\cos\theta \quad (2)$$

where d is crystallite size, λ is the x-ray wavelength, B is full width at half maximum intensity of diffraction peak, and θ is diffraction angle. In some embodiments, the crystallite size of martensite in the <110> phase varied from about 100 to about 150 Å, depending on the alloying elements in Fe—Cr hardfacing.

Figure 4:
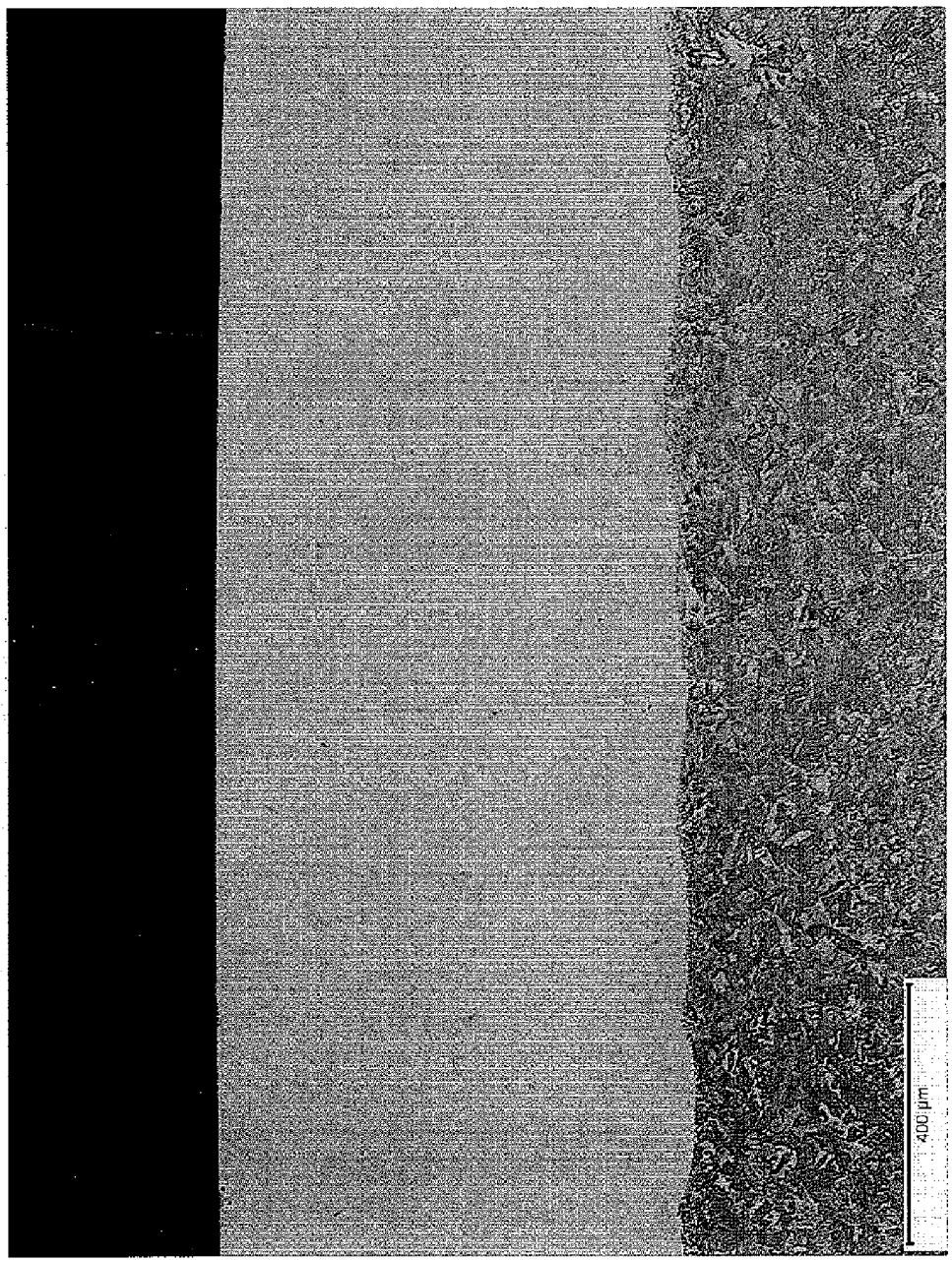
FIG. 4 is an optical microscope image depicting the microstructure of laser-cladding alloy A, as made in accordance with principles described herein.
Figure 10:
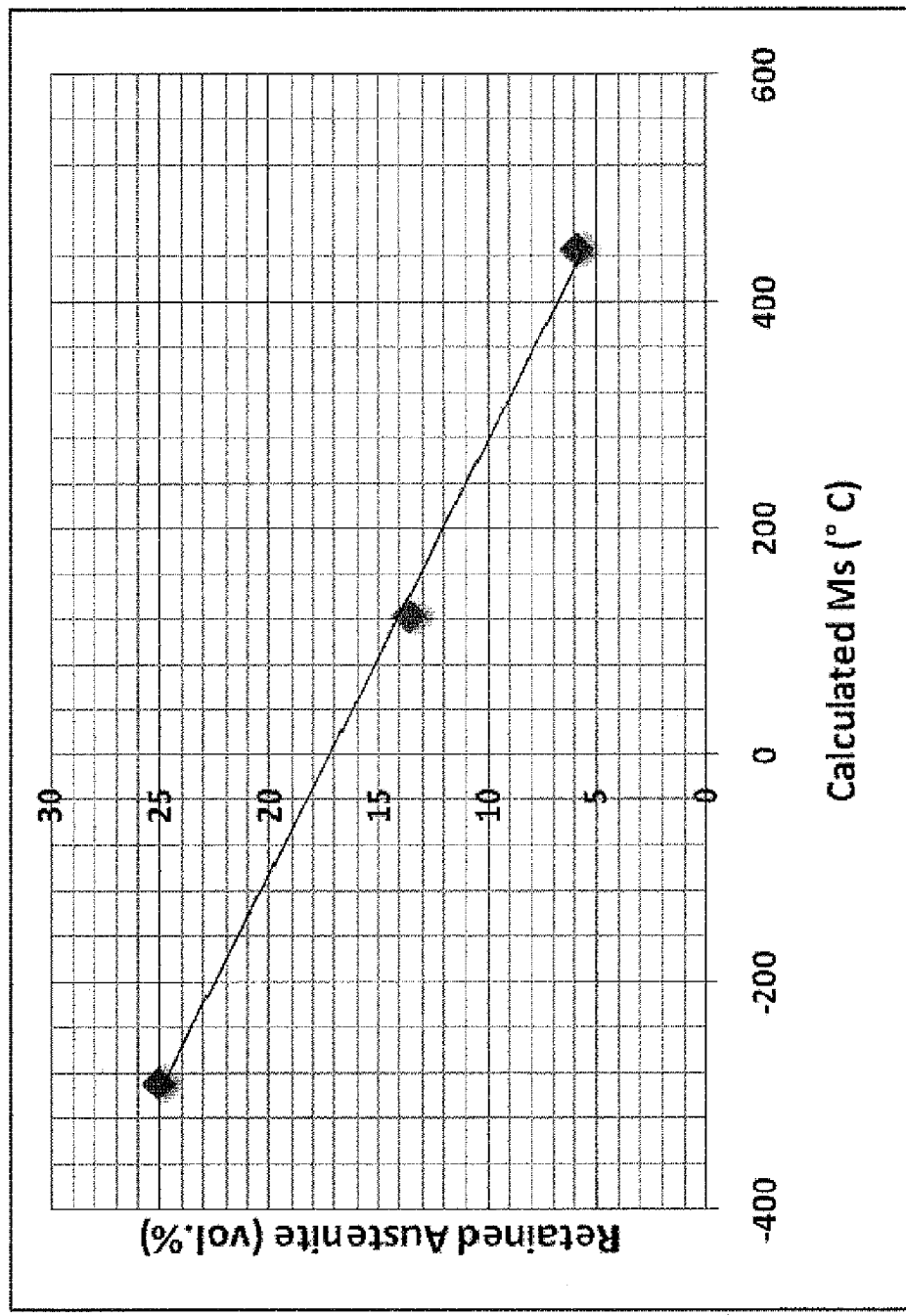
FIG. 10 is a plot of the amount of retained austenite versus calculated martensite formation temperature (Ms) of laser cladding Fe—Cr hardfacings (A, B and C), as made in accordance with principles described herein.

The volumetric fraction of retained austenite was plotted against the calculated Ms (martensite formation temperature) in FIG. 10. A linear relationship with R=0.998 was obtained. Therefore according to this relationship, subjecting an alloy powder having a higher calculated Ms to laser cladding will result in a lesser amount of retained austenite in the quenched alloy and lead to higher dimensional stability of laser cladded tools employing that hardfacing. Post heat treatment to reduce retained austenite in laser hardfacing is typically not feasible for down-hole drilling tools. It is therefore desirable to select a Fe—Cr alloy material having high Ms for a laser cladding process, and therefore resulting in a hardfacing having high martensite content and low austenite content FIG. 4 is an optical microscopy image of hardfacing (A) having a metallurgical bond to the base metal of AISI 4330. The image revealed a very dense microstructure. Hardfacings A (FIG. 5) and B, further consisted of a dendritic columnar structure, and hardfacing C (FIG. 6) appeared to have a less structured form of dendrites due to its large $\Delta T_f$, (freezing temperature of liquid). In some embodiments, it is believed that a material formed at higher Ms will have a dendritic columnar structure in laser cladding hardfacing compositions.

Figure 5:
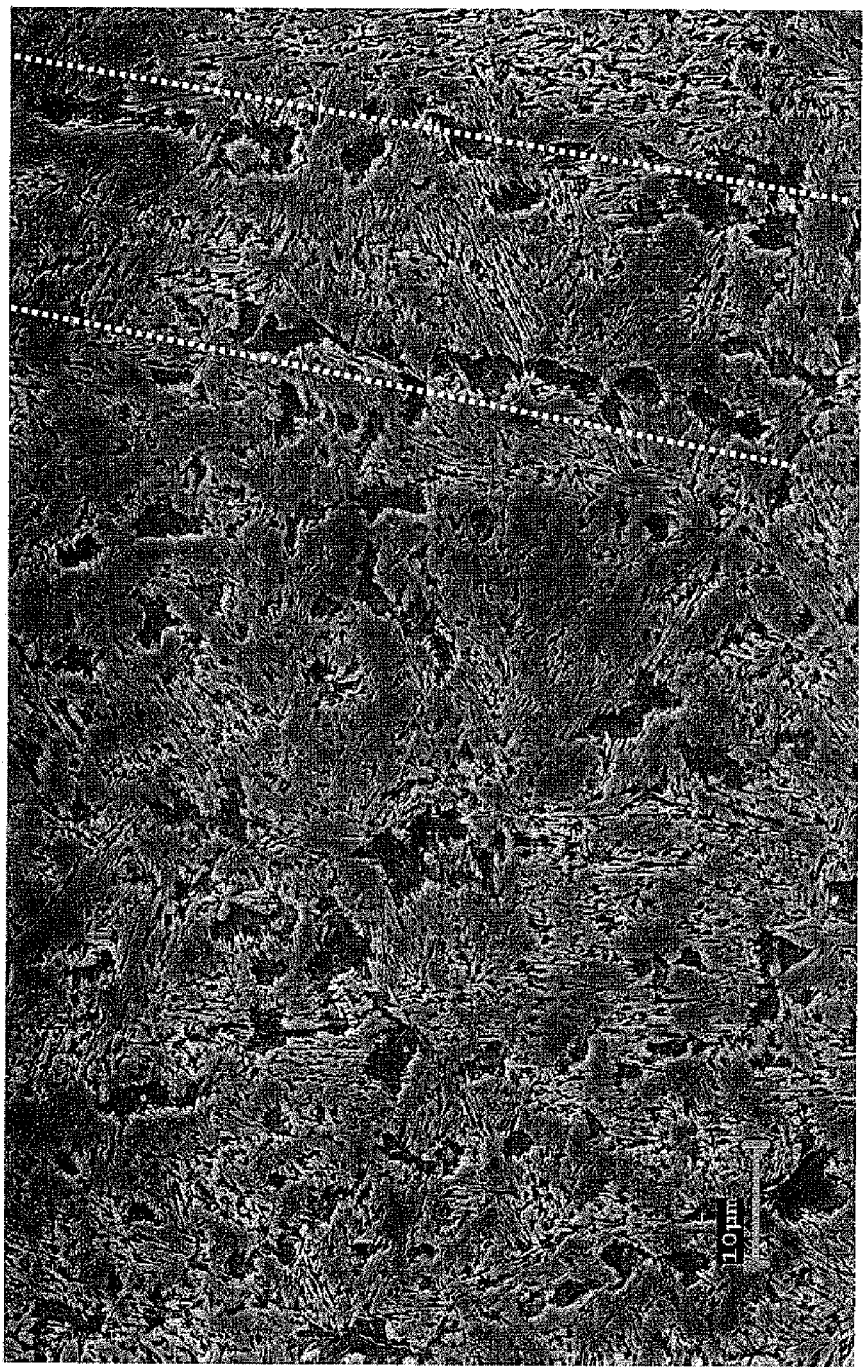
FIG. 5 is an optical microscopy image depicting the columnar structure of laser cladding alloy A, as made in accordance with principles described herein.
Figure 6:
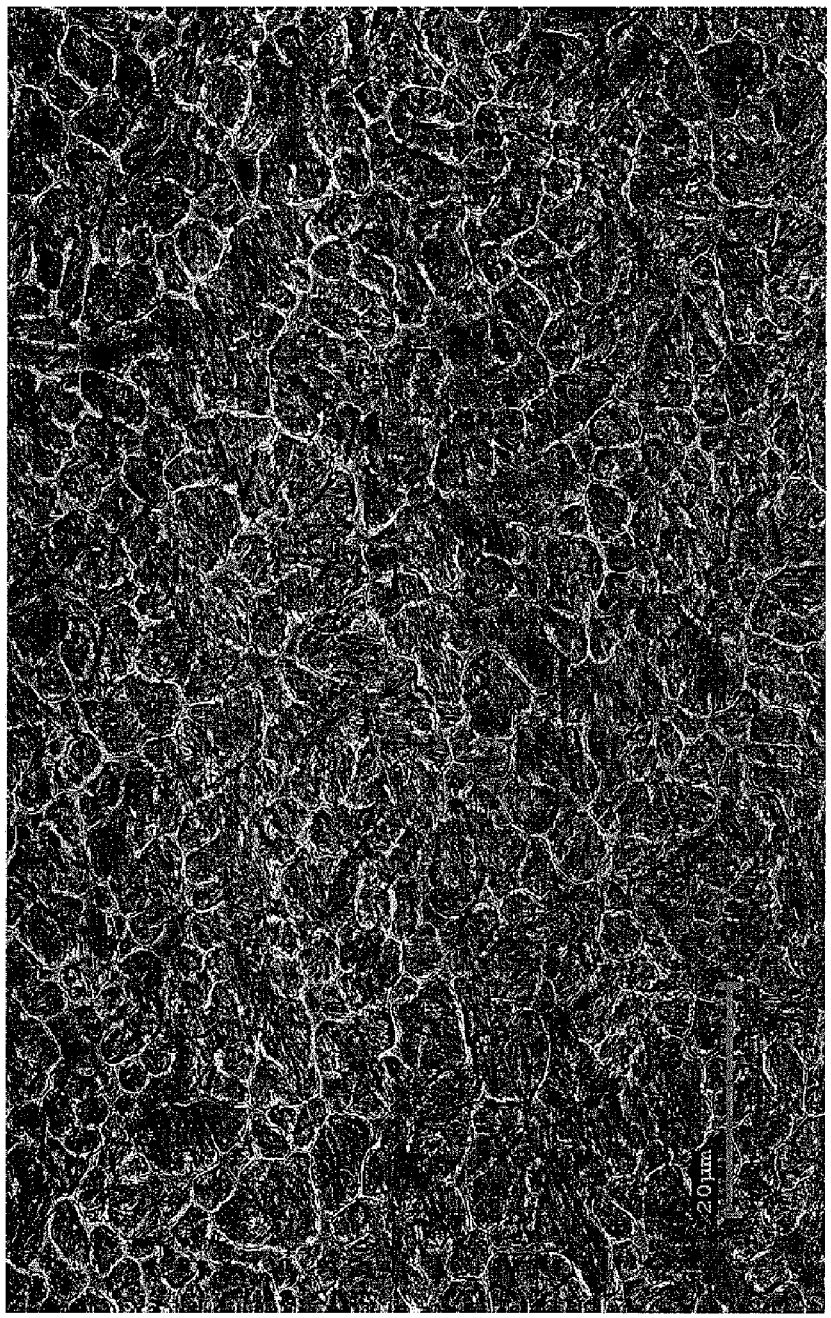
FIG. 6 is an optical microscopy image depicting the non-columnar structure of laser cladding alloy C, as made in accordance with principles described herein.

Scanning electron microscopy revealed that the dendritic columns of hardfacing A and B grew from the hardfacing/base-material interface in a direction perpendicular to the functional surface direction within ±15° In FIG. 5 a, an example of the columnar structure of hardfacing A is indicated by hatched lines, and further illustrates the angle of about 15 degrees to the surface at which the columns form. The top edge of the image depicted in FIG. 5 is parallel to the surface of the hardfacing.

Figure 7:
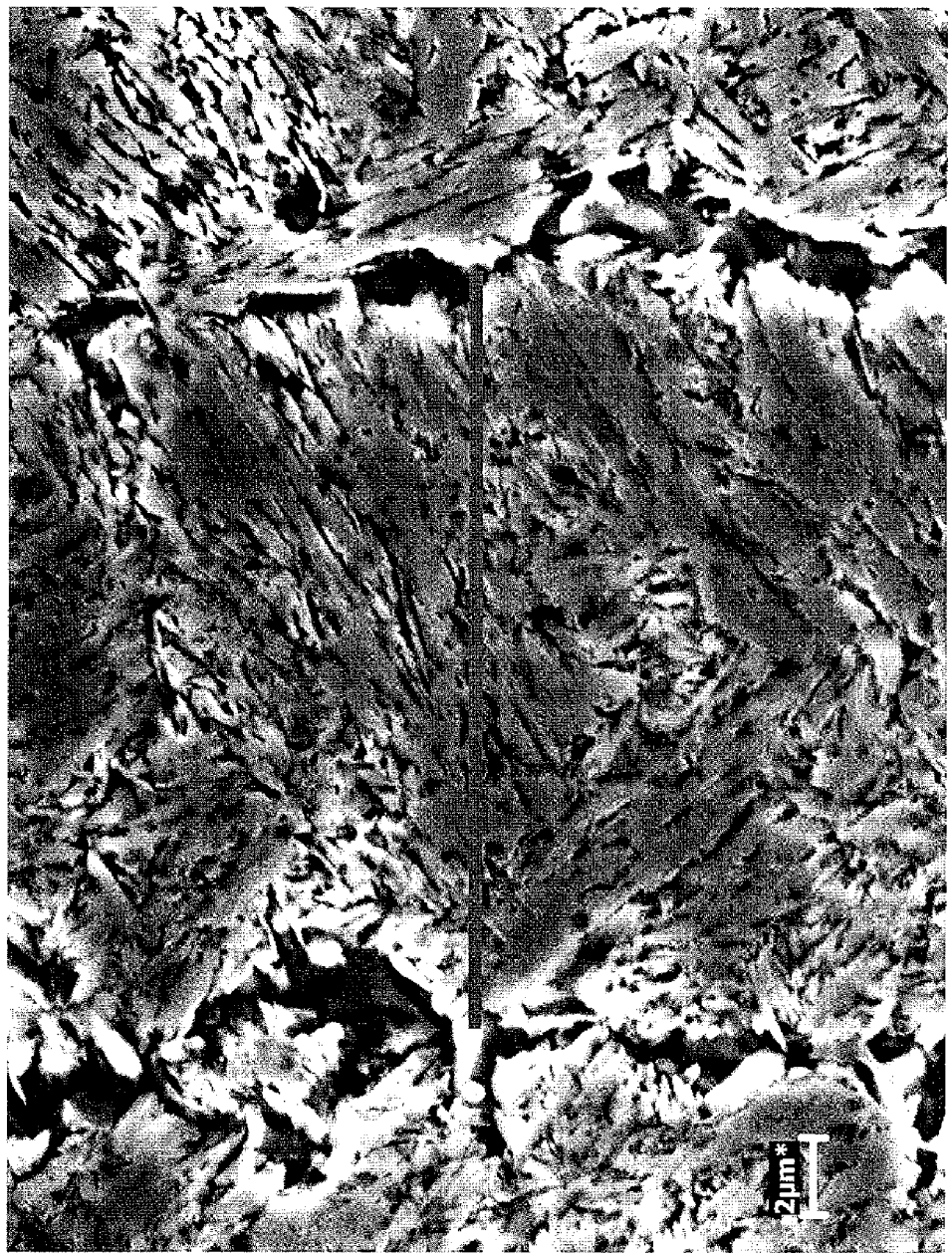
FIG. 7 is a scanning electron microscopy image of Laser Cladding alloy A, as made in accordance with principles described herein.
Figure 8:
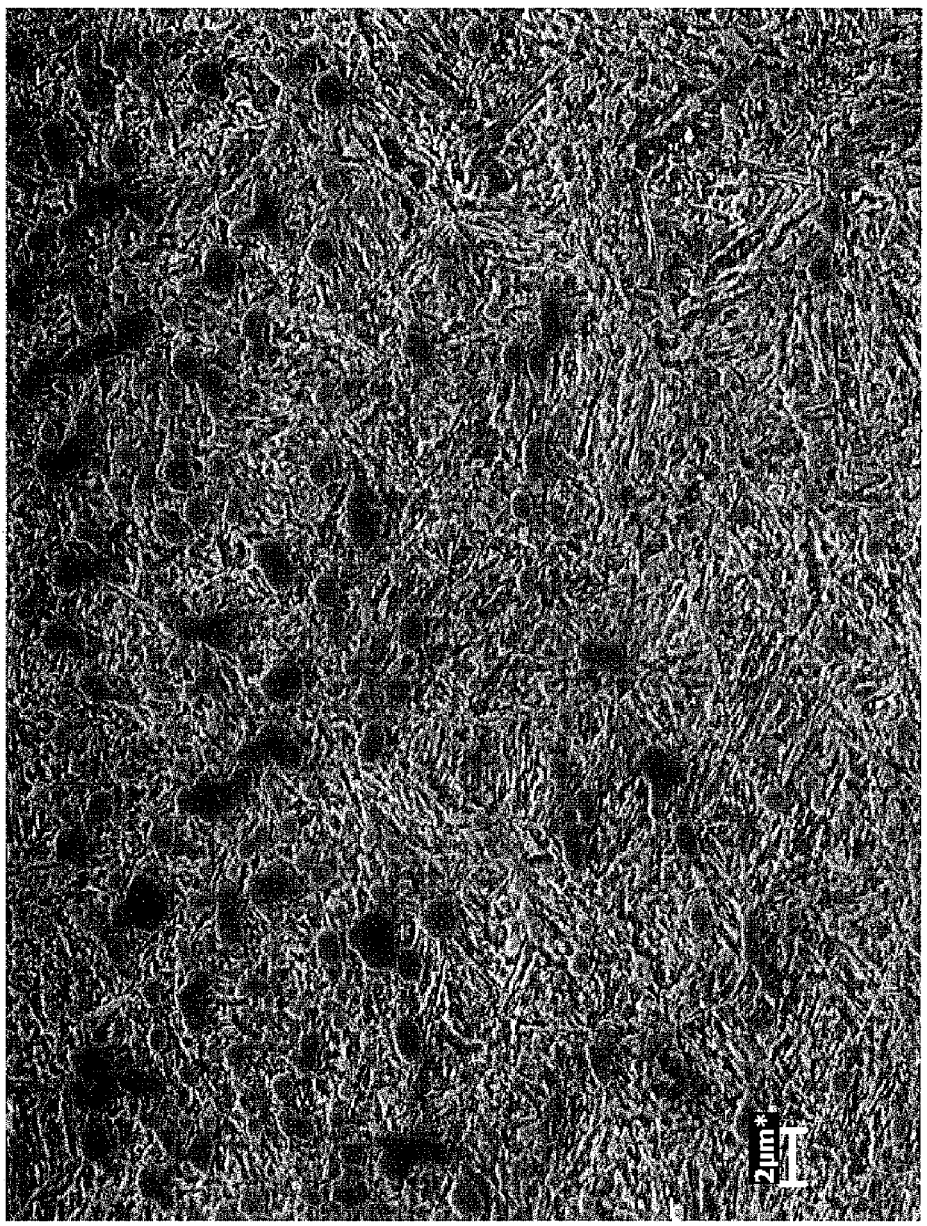
FIG. 8 is a scanning electron microscopy image of quenched and tempered martensite of AISI 420, in accordance with principles described herein.

The average column size of hardfacing A is depicted by a horizontal line in FIG. 7. Each column consisted of about 2 µm platelets (laths), which were larger than quenched-and-tempered martensite in AISI 420 in FIG. 8. In AISI 420, martensite plates are much finer compared to that in Laser Cladding A. However, the microhardness of Laser Cladding A was greater than that of a quenched AISI 420 (697 Hv as compared to 633 Hv). In addition, nodular chromium-rich carbide precipitates in a martensitic matrix (FIG. 8) could be deleterious to corrosion property of AISI 420. It is note worthy that the crystallite size of hardfacing B is smaller than that of hardfacing A (Table 2); however, unexpectedly, A had higher microhardness than B, attributed to higher volume of martensitic phase.

Example 2

Thermal Shock Resistance

Laser Cladding hardfacing A, HVOF WC-10Co-4Cr hardfacing, and hard chromium plating on AISI 4330 ring, (102 mm OD×57.2 mm ID×25.4 mm (4"OD×2.25"ID×1")), were heated to 538° C. (1000° F.) in a furnace in air for 60 minutes and then quenched to room temperature in a 25% polymer/water quenching material. Five heating/quenching cycles were applied to each individual coating. Surface defects in these coatings were examined by Dye-Penetrant technique. Craze-type cracks were observed in HVOF WC-10Co-4Cr hardfacing, and cracks in axial direction were developed in hard chromium plating, while no crack was observed in Laser Cladding hardfacing A. The results are believed to indicate that Laser Cladding A had a higher strength and greater thermal stability than HVOF WC-10Co-4Cr hardfacing, and hard chromium plating.

Example 3

Corrosion Resistance

Laser Cladding hardfacing A, HVOF WC-10Co-4Cr hardfacing, and hard chromium plating on AISI 4330 ring, (102 mm OD×57.2 mm ID×25.4 mm (4"OD×2.25"ID×1")), were immersed in an aerated 3.5 wt. % salt solution at 93° C. (200° F.) for 100 hours. Fine corrosion pits were developed in HVOF WC-10Co-4Cr hardfacing and hard chromium plating. No evidence of corrosion was observed in Laser Cladding A. Laser Cladding A is thus shown to be superior to the other two coatings in a chloride environment.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A hardfacing composition comprising:
an Fe—Cr alloy comprising at least 80 wt % iron, about 2 wt % to about 20 wt % Cr, less than 1 wt % Si and 0.20 wt % C or less;
wherein said alloy comprises a microstructure of least 80 vol % martensite; and
less than 20 vol % austenite, and wherein said microscructure comprises a martensite columnar structure, wherein said columnar structure are perpendicular ±15 degrees, to the alloy's functional surface, and less than about 30 µm in width.

2. The composition of claim 1, wherein the microstructure has a predominant <110> crystallographic orientation, wherein ratio of x-ray diffraction intensity <110> to <200> is greater than about 12.

3. The composition of claim 1, wherein the microstructure comprises crystallites, wherein the crystallite size in the <110> direction is greater than about 200 Angstrom.

4. The composition of claim 1, further comprising at least one of W, Mo, V, Mn, Ni, P, and S.

5. The composition of claim 1, wherein thermal expansion coefficient of said composition is within 10% of the thermal expansion coefficient of a base material.

6. The composition of claim 1, wherein the hardness of said composition is greater than about 50 Rockwell C hardness.

7. The composition of claim 1, wherein the microhardness of said composition is greater than 500 Hv.

8. The composition of claim 1, disposed on a base material of a tool chosen from the group consisting of drill bit, rotary cone bit, drag bit, mill tooth bit, reamer, under-reamer, stabilizer, mud rotor, centralizer, mandrel, and wash pipe.

9. The composition of claim 1, disposed on a base material and wherein the composition has a thermal expansion coefficient of about $9 \times 10^{-6}$ m/m K to about $20 \times 10^{-6}$ m/m, and wherein said coefficient is about 90% to about 110% of the thermal expansion coefficient of the base material.

10. Apparatus employed in drilling a borehole comprising:
a drill string component adapted to be connected into a drill string; and
at least one hardfacing composition of claim 1.

11. The apparatus of claim 10, wherein said drill string component is chosen from the group consisting of drill bit, mill tooth bit, reamer, under-reamer, stabilizer, centralizer, mud motor, mandrel, and wash pipe.

12. The apparatus of claim 11, wherein said drill string component is a mandrel.

13. The apparatus of claim 11, wherein said drill string component is a wash pipe.

14. A hardfacing composition comprising:
an Fe—Cr alloy comprising at least 80 wt % iron, about 2 wt % to about 20 wt % Cr, less than 1 wt % Si, and 0.20 wt % C or less; wherein said composition is disposed on a base material, and the composition has a thermal expansion coefficient of about $9 \times 10^{-6}$ m/m K to about $20 \times 10^{-6}$ m/m, wherein said coefficient is about 90% to about 110% of the thermal expansion coefficient of the base material; and
wherein said alloy further comprises a microstructure of least 80 vol % martensite; and less than 20 vol % austenite, wherein said microstructure comprises a martensite columnar structure, wherein said columnar structure are perpendicular ±15 degrees, to the alloy's functional surface, and less than about 30 µm in width; wherein the microstructure has a predominant <110> crystallographic orientation, wherein ratio of x-ray diffraction intensity <110> to <200> is greater than about 12; and the microstructure comprises crystallites, wherein the crystallite size in the <110> direction is greater than about 200Angstrom.

15. A hardfacing composition comprising:
a quenched product of:
an Fe—Cr alloy comprising at least 80 wt % iron, about 2 wt % to about 20 wt % Cr, less than 1 wt % Si and 0.20 wt % C or less;
wherein said alloy comprises a microstructure of least 80 vol % martensite; and
less than 20 vol % austenite, and wherein said microstructure comprises a martensite columnar structure, wherein said columnar structure are perpendicular ±15 degrees, to the alloy's functional surface, and less than about 30 µm in width.

16. The composition of claim 15, wherein said quenched product in formed at a quenching rate of 1300K/sec.

17. A method of making a hardfacing composition comprising:
injecting a Fe—Cr powder into a laser beam and heating said powder to a temperature sufficient to form a molten alloy that comprises at least 99 vol % austenite;
applying the molten alloy to a base material;
quenching said austenite at a rate greater than 1300K/sec; and
forming the hardfacing composition, wherein said composition has a microstructure comprising greater than 80 vol % martensite, less than 20 vol % austenite and 0.20 wt % C or less.

18. The method of making the composition of claim 17, wherein the martensite is formed at a martensite formation temperature (° C.), said temperature is defined by:
1320−42(Cr wt %)−61(Ni wt %)−33(Mn wt %)−28(Si wt %)−1667(N wt %+C wt %).

19. A method of making a structure coated with a hardfacing composition, comprising;
coating a base material with a molten Fe—Cr alloy; wherein said coating comprises;
injecting a Fe—Cr powder into a laser beam and heating said powder to a temperature sufficient to form a molten alloy that comprises at least 99 vol % austenite;
applying the molten alloy to a base material;

quenching said austenite at a rate greater than 1300K/sec; and forming the hardfacing composition, wherein said composition has a microstructure comprising greater than 80 vol % martensite, less than 20 vol % austenite and 0.20 wt % C or less.

20. The composition of claim 19, applied to an underlying metal via a thermal spray technique.

21. The composition of claim 20, wherein the thermal spray technique is chosen from the group of laser cladding, plasma transferred arc, and flame spray.

* * * * *